March 29, 1955 A. LESTI 2,705,258

COLOR TELEVISION CAMERA

Filed Aug. 8, 1951 3 Sheets-Sheet 1

INVENTOR.
Arnold Lesti

March 29, 1955

A. LESTI 2,705,258

COLOR TELEVISION CAMERA

Filed Aug. 8, 1951

3 Sheets-Sheet 2

INVENTOR.

Arnold Lesti

March 29, 1955 — A. LESTI — 2,705,258

COLOR TELEVISION CAMERA

Filed Aug. 8, 1951 — 3 Sheets-Sheet 3

INVENTOR.

Arnold Lesti 2,705,258

COLOR TELEVISION CAMERA

Arnold Lesti, Nutley, N. J.

Application August 8, 1951, Serial No. 240,899

19 Claims. (Cl. 178—5.4)

This invention is in an improved color television camera to produce simultaneous color television signals for each of the primary colors of the color system. Sequential color signals also may be produced.

An object of this invention is to provide a simple, stable, fully electronic color television camera which does not require continuously moving mechanical parts, which will give excellent color registration, and which does not require critically aligned components.

An important object of this invention is to provide a color television camera for producing simultaneous video color signals for each of the primary colors, wherein one camera tube is used to produce all of the primary color signals.

A further object of this invention is to obtain three independent simultaneous primary color signals by a single camera tube having a single electron beam with standard horizontal and vertical deflection motion to give a single scanning raster, and to use this in conjunction with an optical system which focuses one picture on the camera tube.

In accordance with certain features of this invention there is utilized a color screen to intercept the picture light before it reaches the photoelectric surface of the camera tube. This color screen consists of horizontal contiguous color strips. The strips are arranged in three sets, there being one set for each of the primary colors. The strips are transparencies of their respective colors. In one version of this invention the strips are color transparent in a variable area which varies sinusoidally with respect to the horizontal distance. All strips corresponding to one primary color have their varying areas of the same sinusoidal period, that is, horizontal distances or wave lengths between two successive crests of the waveforms are equal. There are preferably although not necessarily three periods or spacings of the sinusoidal transparencies, one for each of the primary colors. The total number of strips is preferably greater than three times the number of horizontal lines required to produce one complete picture. The color strips are close enough together so that the picture light which passes through three adjacent areas will not be distinguished as coming from separate areas, but color information will be obtained from such contiguous areas which will closely represent the color of the whole picture area comprising the three strips. The electron beam spot of the cathode ray camera tube has a vertical height equal to the height of three adjacent color strips and a width less than the distance between two successive crests or wave length of the shortest spaced sinusoidal wave. During the scanning operation by the electron beam, the variable sinusoidal areas will act as carriers of different frequencies, one for each of the primary colors. It makes no difference how the beam strikes the transparencies in the vertical direction. The results are the same. The single electron beam will be simultaneously modulated by all color picture signals superimposed on the carriers. Each color signal will modulate its own carrier. The single output connection of the camera tube will have three separate signals which may be separated by electrical filters. The sinusoidal transparencies take the form of variable densities in another version of this invention.

It is an object of this invention to specify the frequencies of the carriers, with due regard to the nature of the modulating process, so as to reduce the total bandwidth of the frequencies necessary, and in order to avoid interference of the color signals one with another. An analysis of the process of modulation of the electron beam, given hereinbelow, shows that there are five sets of components of modulation for each color signal. In the lowest range of frequencies components due to each color overlap. This region is not utilized by the band-pass filter circuits. A further object of this invention is to reduce the overall bandwidth by causing the lower side-band components of the lowest frequency carrier to fall in the above mentioned lowest range of frequencies, and utilizing the carrier and its upper side-band components for color signals information.

Another feature of this invention is to preferably cause the color which requires the least bandwidth, for example blue, to have a carrier of a middle frequency just above the upper limit of the upper side-band of the lowest carrier frequency referred to hereinabove, and to utilize the upper and lower side-bands and carrier for picture information. The remaining highest frequency carrier lies above the range of the upper side-band of the middle carrier. One of the side-bands of the highest carrier and the carrier itself with a small portion of the other side-band may be utilized for color information.

Another object of this invention is to preferably limit the picture detail as it is optically projected onto the photoelectric surface of the camera tube so as to limit the bandwidth of the side-bands referred to hereinabove. Since the scanning process is capable of passing frequencies greater than the highest color video frequency required a limitation is preferred for the amount of picture detail present. Otherwise, in some range the side-bands of the various colors will overlap. Any attempt to separate the carrier frequencies further will require a scanning process capable of passing higher frequencies, but this will also pass higher picture frequencies, hence a certain amount of overlap would occur for frequency bands corresponding to different colors. Non-interference is possible by limiting the picture detail optically. The smallest picture element should be preferably larger in horizontal distance than half of the distance between two successive crests of the sinusoidal color transparency corresponding to the lowest carrier frequency. Picture detail may be limited by inserting before the color screen a translucent member through which the picture light must pass before it reaches the color screen. The degree of transluceny is set to give the required limitation on the picture detail. The translucent member will scatter the light slightly so as to reduce picture detail to the value that it would have with a video picture frequency bandwidth of the specified amount and not more. The translucent member may be in the back supporting member of the color screen, or in any other position in the optical system, or as part of the lenses. An optical system which sets picture detail to the correct value by lack of sharp-focusing or other methods would also be satisfactory. The actual video frequency energy contained in the frequencies which may overlap would be small because even with a sharply focused non-limited optical system the picture detail which would give rise to high frequencies is weak and hence the overlapping frequencies would be weak. However, if the video bandwidth for each color is deliberately reduced to effect overall economies in the system frequency bandwidth, the methods of optically reducing picture detail given hereinabove would be useful.

In accordance with certain features of this invention a camera tube is provided with an electron beam whose spot is substantially rectangular in shape, and with a color screen of the type described hereinabove installed as part of the structure of the tube adjacent to the photoelectric surface to intercept the light from the optical system before it reaches the photoelectric surface. In another version of this invention the said color screen is installed as a separate unit in the optical system proper, with the picture image focused thereon by a first adjustable lens system, and a second fixed lens system focuses the image on the color screen onto the photoelectric surface of the camera tube. The first arrangement is feasible in the image orthicon type of camera tube while the second arrangement can be used with any type of camera tube.

Another object of this invention is to provide means for stabilizing the frequencies derived from the above mentioned scanning process. The magnitude of these frequencies depends upon the amplitude of the horizontal deflection of the electron beam of the camera tube. Since the horizontal repetition rate is fixed an increase of horizontal amplitude will cause the scanning of more sinusoidal transparencies in the same time and hence increase the frequencies of the carriers and other frequencies which are developed as a result of the modulating process. In accordance with certain features of this invention a narrow band-pass filter is provided driven by the output signals of the camera tube and adapted to pass one of the carrier frequencies. The output of this filter is connected to a frequency discriminator which, in turn, produces a voltage of a polarity which depends upon whether or not the carrier frequency is higher or lower than the frequency to which the frequency discriminator is tuned. The output of the discriminator is used to control the gain of the horizontal deflection amplifier in such a manner so that if the amplitude is greater than that required to produce a carrier of frequency similar to the discriminator frequency the gain of the horizontal deflection amplifier is lowered, and if the amplitude is less than that required to produce a carrier of frequency equal to the discriminator frequency the gain of the horizontal deflection amplifier is increased. Thus the frequencies are stabilized by feedback and the regular band-pass filters will operate in the correct frequency ranges.

While the primary object of this invention is to produce simultaneous signals for each of the primary colors of the additive color system for simultaneous types of color systems, another subsidiary object is to utilize such simultaneous signals which are in separate circuits and switch them periodically and in succession onto a single circuit thereby producing color sequential signals which may be used in color sequential systems.

The above mentioned and other features and objects of this invention and the manner of attaining them will become more apparent and the invention itself will be best understood by reference to the following description of an embodiment of the invention taken in conjunction with the accompanying drawings in which.

Fg. 9 is a block diagram of a method of converting from a simultaneous type to a sequential type color system.

Figure 10:
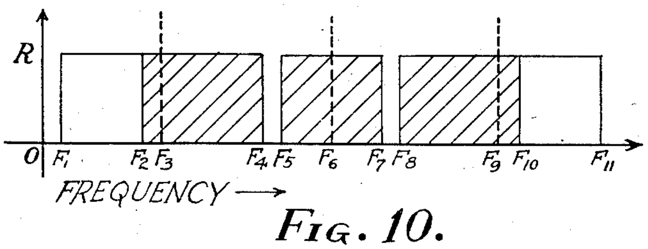

Fig. 10 is a graph of the frequency spectrum of the camera tube output.

Figure 11:
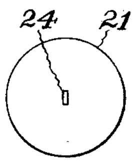

Fig. 11 is an enlarged view of the front face view of the electron gun with rectangular aperture.

Figure 1:
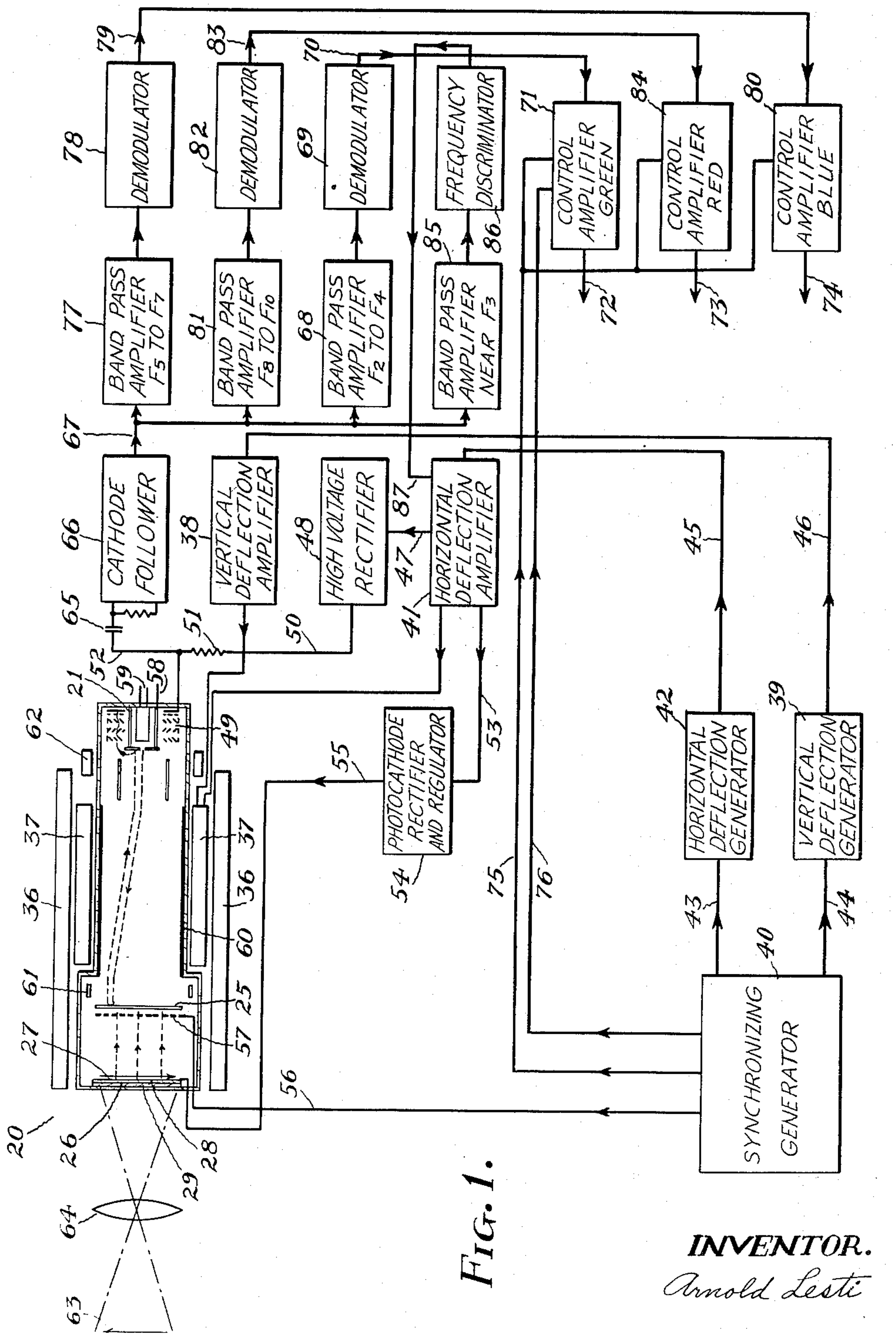
Fig. 1 is an overall digram of the color television camera with associated synchronizing, beam deflection, and filter circuits.
Figure 3:
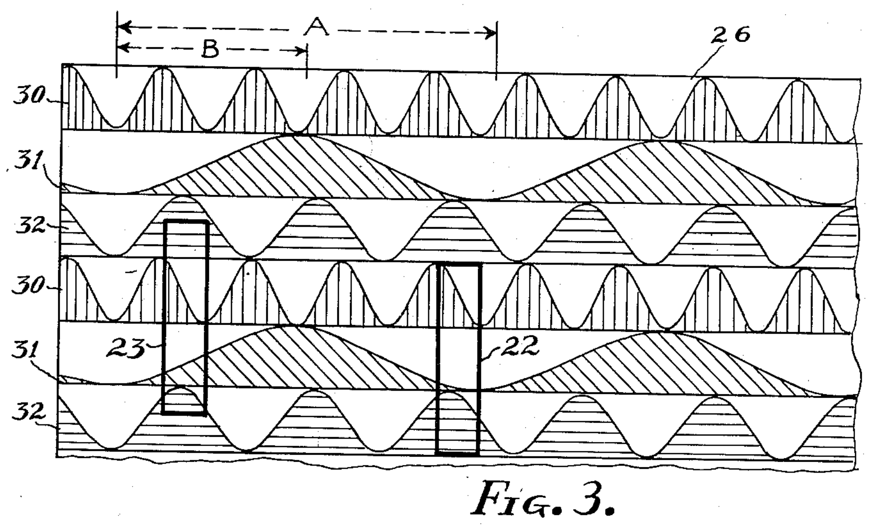
Fig. 3 is an enlarged detail view of a small portion of the color screen shown in Fig. 2, illustrating the contiguous sinusoidally variable area color transparencies.
Figure 4:
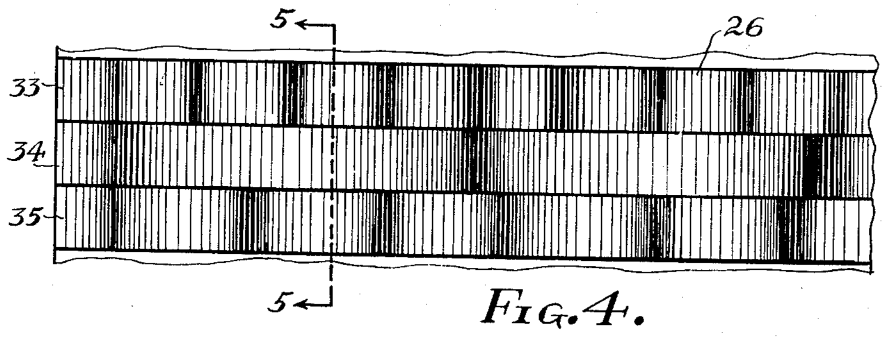
Fig. 4 is a view similar to Fig. 3 with sinusoidal variable density color transparencies.

Referring to Fig. 1, numeral 20 generally represents the image orthicon tube which is of standard design except for two modifications. The first difference is in the electron beam which is emitted from gun 21. This beam produces a spot on the target 25 which is rectangular in shape with height equal to the height of three adjacent color strips. Fig. 3 illustrates the color screen 26 with rectangular area 22 which corresponds with the rectangular beam spot on target 25. A rectangular area 23 is also shown displaced vertically with respect to area 22. Gun 21 shown in Fig. 1 has a rectangular opening, illustrated as 24 in Fig. 11, to facilitate the production of the electron beam which will impinge upon the target 25 as a spot substantially rectangular in shape. The second difference of the image orthicon tube 20 from the conventional type is that a color screen 26 is installed adjacent to the clear transparent glass plate 28. The color screen or plate 26 contains a plurality of series of wave forms of specified wave lengths depicted thereon as detailed hereinbelow. It is upon the plate 28 that the photoelectric surface 27 is coated. The picture is focused onto the photoelectric surface 27 after going through the color transparencies of the color screen 26. While Fig. 3 illustrates a color screen or plate with variable sinusoidal areas transparent to the respective primary colors, it is possible to use a screen with variable density color strips such as is illustrated in Fig. 4. In Fig. 3 the areas enclosed by the hatching lines correspond to color transparent areas. All other areas are opaque to light. In Fig. 4 shading lines that are closer together represent areas of greater opacity which will let less light through. In Fig. 3, 30 represents red transparencies, 31 green, and 32 blue transparencies. In Fig. 4, 33 represents red transparencies, 34 green, and 35 blue transparencies.

In Fig. 1 there is illustrated a focusing coil 36 to focus the electron beam onto the target 25, and deflection coils 37 for obtaining standard horizontal and vertical deflection motion of the electron beam and thereby scan the target area. The vertical coils are driven by a vertical deflection amplifier 38 which in turn is driven by the vertical deflection generator 39. The latter is driven by pulses from the synchronizing generator 40 which is of standard construction and supplies all of the other required voltages to the camera. The horizontal deflection coils are driven by horizontal deflection amplifier 41 which in turn is driven by horizontal deflection generator 42. The latter is driven by pulses from the synchronizing generator 40. By way of example, the frequency of the pulses on conductor 43 for the horizontal repetition rate may be 15,750 per second, while the frequency of the pulses on conductor 44 for the vertical repetition rate may be 60 per second. Sawtooth waves will be applied on conductor 45 with a repetition rate of 15,750 per second, and on conductor 46 at the rate of 60 per second. This will give the standard odd-line interlace with 30 frames per second each of 525 lines. Units 38, 39, 40, and 42 are of known and standard construction. Driven from the horizontal deflection amplifier 41 through conductor 47 is high voltage rectifier and filter 48 of standard design which supplies a steady positive voltage to the electron multiplier 49 through conductor 50 and resistor 51. Also, driven from the horizontal deflection amplifier 41 through conductor 53 is a photocathode rectifier and regulator 54, of standard construction, to supply steady negative voltage to the photoelectric surface 27 via conductor 55. The synchronizing generator places blanking pulses on conductor 56 which are applied to the wire mesh screen 57 to blank the operation of the camera tube so that there will be no camera signal output during retrace time. Heater voltage is supplied to conductors 59. Positive voltage is supplied on conductor 58 for the gun, while high accelerating anode voltage is applied to conductive coating 60 on the interior of the camera tube. The decelerating ring 61 has a low voltage source connected to it. These voltages cause the tube to operate in a known and standard manner. Alignment coil is shown as 62. The camera tube 20 illustrated in Fig. 1 differs from the standard type in its operation with respect to the function of the rectangular cathode ray spot and color screen.

The light from image 63 is focused by lens 64 onto the semitransparent photoelectric material 27. The light must pass through the glass plate 29 and color screen 26 before it reaches the photoelectric material. Each of the three kinds of color transparent strips will filter the picture light and allow the light of the color to which the strip is transparent to pass through to the photosensitive surface 27. The color light which passes through will be in the form of variable areas as illustrated in Fig. 3 or variable densities as shown in Fig. 4. In the case of variable areas the light will vary in intensity along a strip in accordance with the variations of picture intensity. In the case of the variable density color screen the light will vary in intensity due to two causes; one is the variable density of the color transparencies and the other is due to the variations of picture intensity. These two effects are superimposed. The picture light which reaches the semitransparent photocathode 27 will have missing from it along a given strip the color whose combination forms the color complement of the color which the strip passes, and in addition in the case of the variable area screen those portions of the picture light will be missing which lie outside of the portions within the sinusoidal curves shown in hatching in Fig. 3, and in the case of the variable density the picture light will also be reduced in intensity in accordance with the sinusoidal changes of density along the given color strip. In some cases it is possible to change the shape of the variable areas into shapes that deviate from the sinusoidal; for example, a series of spaced circles or squares. The variable density screen could also have such corresponding changes of density. However, the sinusoidal variations shown are superior because no harmonics are produced by them which for certain carrier frequencies will overlap into regions which are utilized by the side bands of other carriers.

The picture light which strikes any one small spot of the photoelectric surface is of one of the primary colors and not a combination of them. The semitransparent surface 27 receives the color light image on one side while photoelectrons are emitted from the other side which faces the wire-mesh screen 57 and target 25, to produce an electron image corresponding to the desired picture information. The two-sided target plate is of low-resistivity glass. One side of this target plate receives the electron image from the photocathode through the wire screen and focused magnetically by the focusing coil. The photoelectrons are emitted from the cathode surface in direct proportion to the light actually reaching the surface 27. The electron image is accelerated toward the target which is at a positive potential with respect to the photocathode. When the photoelectrons strike the target plate, secondary electrons are ejected from the screen side of the target to form a positive charge pattern on the plate. The brightest parts of the picture produce the greatest number of photoelectrons and, therefore, the greatest number of secondary electrons when the photoelectrons in the electron image strike the screen side of the target plate. This makes the target more positive for the light parts of the optical image than for the darker picture elements. Secondary electrons ejected from the target are collected by the mesh screen. As a result, a charge image is formed on the target plate corresponding to the picture elements in the light image and the charge is arranged in horizontal strips corresponding to the color transparency on the color screen, with the charge on any one given strip across the target plate corresponding to picture light of one primary color. The charge intensity is determined by the color intensity of the light of the picture along the corresponding color strip and is also in accordance with the variable sinusoidal areas of that strip or variable densities, depending upon which type of color screen is used. The charge distribution is preserved for a time because the target plate has a high resistance along the surface. But in the front-to-back direction, the glass target has a low resistance. The charge pattern appears on both sides of the target, with the brighter elements of the light image more positive than the darker areas.

While the charge pattern is being formed on the target plate 25 it is scanned by the rectangular electron beam spot from the electron gun. The electrons striking the target are low in velocity and no secondary electrons are produced. Enough electrons are deposited on the glass plate from the electron beam to neutralize the positive charge. The more positive parts of the target require a greater number of electrons from the rectangular scanning beam than the less positive areas. The electrons in the beam in excess of the amount required to neutralize the positive charge on any one spot are reflected back to the electron gun.

If a color screen such as is illustrated in Fig. 3 is used a charge pattern will be formed on the target plate occupying sinusoidal horizontal strips in which the positive charge is in areas which correspond to the areas in hatching in Fig. 3, with varying intensity of charge in accordance with the light intensity in the picture. As the electron beam spot which corresponds to the rectangle 22 in Fig. 3 scans the charged areas, electrons from a given portion of the beam will be deposited on the charged area which is struck by that given portion, and the amount of electrons deposited will be in accordance with the intensity of the positive charge on the struck area. Since the beam height equals the height of three adjacent color strips, charged areas corresponding to each of the primary colors will be struck simultaneously by the rectangular electron beam. The total amount of electrons deposited will be in accordance with the combined charges on all the areas struck by the beam. As the electron beam scans the target the total charge distribution on the combined areas for the primary colors simultaneously struck by the beam will determine the amount of electrons returned to the electron gun at the instant when the beam strikes such combined areas. As scanning proceeds the amount of electrons returned to the gun will vary in accordance with the variations of charge on the areas struck by the beam. The more positive areas corresponding to brighter light will cause fewer electrons to be returned.

The manner in which the single electron beam working into one circuit carries distinct and separate information for all of the primary colors will first be given in simplified terms. A more detailed mathematical analysis is given hereinbelow after the simplified explanation.

As the beam scans the charged target plate the amount of electrons returned to the gun varies at three distinct rates and each rate of variation corresponds to one primary color and is modulated by the light distribution of that color along the horizontal strip. In Fig. 3, the distance B corresponds to the width of the smallest picture element that can be resolved by the system, and the height of three adjacent color strips is the height of the smallest picture element. The distance A corresponds to the distance which when scanned by the beam will give the highest picture frequency that can be passed by the system. $A=2B$. By way of example, the green color has a carrier of lowest frequency, indicated in strips 31 in Fig. 3, and strips 34 in Fig. 4. As the beam moves the scanning operation will cause the charge on the target plate, which corresponds to picture light extending along the green strip and being equivalent for the highest picture frequency component to a sinusoidal of period A, to modulate the carrier frequency derived as a result of the presence of the sinusoidal transparency of period less than A shown as 31 in Fig. 3. The blue color has the waves designated as 32 in Fig. 3 and 35 and Fig. 4. The number of blue sinusoidal waves across a color strip is greater than the number for the red. An example is given wherein the ratio of the number of blue to green sinusoidals is 2.42 to 1. This is the ratio of the carrier frequencies which carry their respective color modulations. The red color has the waves designated as 30 in Fig. 3 and 33 and Fig. 4. In the same example the ratio of the number of red to green sinusoidals is 3.84 to 1. This is also the ratio of the carrier frequencies which carry their respective modulations. Other ratios are possible depending upon the bandwidth of frequencies allotted to the various primary colors. The beam in scanning across the target area need not be positioned as illustrated as 22 in Fig. 3. It may be positioned as shown by 23 or in any other vertically displaced position. The vertical position relative to the horizontal color strip may change as the beam sweeps across the target without disturbing the modulations for each color per horizontal sweep. That is, if the horizontal lines due to scanning by the beam are not parallel to the color strips or to the strips of charges on the target plate, the beam will cross strips as it scans. In doing this the active sinusoidal wave per color is not affected. This may be understood by reference to Fig. 3. Since the height of the beam equals that of three adjacent strips two adjacent strips are always fully struck by the beam. The remainder of the beam has a combined height equal to a strip. All strips have the same height. Since every third strip is of the same color with the same sinusoidal wave period and same phase with respect to vertical distances, the remainder of the beam must strike a strip on its lower side of the same color as the strip that it strikes on the upper side. If it strikes the lower strip by a given part of the height of the strip it must strike the upper strip by the amount by which the beam fails to strike the lower strip entirely, and the beam strikes the upper strip where this strip has a transparency exactly equal to that part which the beam failed to strike in the lower strip. The combined parts of the upper and lower strips struck by the beam produce a sinusoidal wave which is exactly similar to what it would be if it were derived by the beam striking one strip fully. In Fig. 3 the rectangular beam 22 strikes three adjacent strips fully, but at 23 it strikes two adjacent strips fully and an upper and a lower strip of the same color partially, but if the amount struck on these upper and lower strips are combined a complete sinusoidal wave is obtained. It is expected that the horizontal scanning lines will be aligned as closely parallel to the horizontal color strips as possible, but some crossing of the lines may be tolerated without deleterious effects. The active color sinusoidals always lie within the smallest picture element which may be resolved by the system. The same argument holds true for the type of transparencies shown in Fig. 4 and other types.

The beam of electrons which return to the gun arrive close to the aperture from which the electron beam emerged. The returning beam current is proportional to the electrons in the beam. The electron multiplier 49 is of standard design and serves to multiply or amplify the number of electrons that strike it starting at the aperture plate and ending at the final electrode which is connected to the output conductor 52 shown in Fig. 1. The signal voltage at this point is a complex function of the time, and it may be resolved into components. For each color there is a direct current or D. C. component, a band of frequencies which occupy a range up to the highest picture frequencies, a carrier frequency and its upper and lower side-bands. The side-bands contain the picture frequencies corresponding to the color from which the carrier frequency is derived. Fig. 10 illustrates one method of distributing the frequencies. The ordinate value R is the response which may be in voltage on conductor 52, while the abscissa gives frequencies in cycles per second. In the range from zero to $F_2$ video frequency components are present for all colors. $F_3$ is the green carrier frequency. $F_1$ to $F_3$ is the lower side-band range for the carrier $F_3$ while $F_3$ to $F_4$ is its upper side-band range. $F_4$ to $F_5$ is a guard band to allow for inaccuracies in filter performance and slight shifts in the carrier frequencies notwithstanding stabilization. $F_6$ is the blue carrier frequency. The range $F_5$ to $F_6$ is for the lower side-band for $F_6$ while the range $F_6$ to $F_7$ is the upper side-band. $F_7$ to $F_8$ is guard band. $F_9$ is the red carrier frequency. $F_8$ to $F_9$ is the lower side-band range for $F_9$ and $F_9$ to $F_{11}$ is its upper side-band range.

The output at conductor 52 is coupled to a cathode follower 66 through condenser 65. The output of cathode follower 66 drives through conductor 67, four band-pass amplifiers which may take the form of any one of the various standard types to pass the specified band of frequencies and to amplify. They may consist of separate band-pass filters and separate amplifiers, or a number of tuned stages of amplifiers with staggered tuning or other types of band pass coupling. Band-pass amplifier 68 passes frequencies in the range $F_2$ to $F_4$. Part of the lower side-band in the range $F_2$ to $F_3$ is passed as well as all of the upper side-band range $F_3$ to $F_4$. The lower range is passed to avoid phase change difficulties in the filter and insure full passage of the carrier. The range $F_2$ to $F_4$ is passed, amplified and applied to demodulator 69 which consists of a detector or rectifier with associated filter, all of standard design, to demodulate the frequencies in the range $F_2$ to $F_4$ and deliver an output on conductor 70 which is proportional to the green light picture video signal. The range of frequencies $F_2$ to $F_4$ is above the range in which frequency components of all colors exist. The green video signal on conductor 70 is applied to control amplifier 71 which delivers on output green picture signal on conductor 72. Blanking pulses furnished by the synchronizing generator on conductor 75 are applied to the green control amplifier 71 and synchronizing pulses also furnished by the synchronizing generator on conductor 76 are applied to amplifier 71. This amplifier is of standard construction and has a gain control for setting green contrast, means for adjusting the clipping level of the blanking pulses to set the pedestal height for black level control, and means for superimposing synchronizing pulses on the pedestals for synchronization of the receivers. The output of amplifier 71 on conductor 72 may be connected via a coaxial cable to a line amplifier for distribution to monitoring stations and the equipment at the transmitter.

The output of cathode follower 66 on conductor 67 is also applied to band-pass amplifier 77 which passes frequencies from $F_5$ to $F_7$ for the blue picture signals. In turn, amplifier 77 delivers its output to demodulator 78 whose output on conductor 79 is applied to the blue video signal control amplifier 80. The latter is furnished with blanking pulses from conductor 75 for black level control but with no synchronizing pulses. In all other respects it is similar to amplifier 71. The output of amplifier 80 is applied to conductor 74 which is connected to the same type of circuits as conductor 72.

The output of cathode follower 66 on conductor 67 is also applied to band-pass amplifier 81 which passes frequencies from $F_8$ to $F_{10}$ for the red picture signals. The range of frequencies from $F_{10}$ to $F_{11}$ shown in Fig. 10 are not utilized. While the range from the red carrier frequency $F_9$ to $F_{10}$ is included to avoid phase difficulties and to insure that the carrier is included. The range $F_7$ to $F_8$ is a guard channel. Amplifier 81 delivers its output to demodulator 82 which is similar to the other demodulators. The output of 82 is applied to conductor 83 which in turn feeds red control amplifier 84 whose output is connected to conductor 73. Amplifier 84 is furnished with blanking pulses from conductor 75 but with no synchronizing pulses. In all other respects it is similar to amplifier 71. The red video signals on conductor 73 with pedestal pulses for black level control are applied to the same type of circuits as conductor 72.

The green, red, and blue signals on conductors 72, 73, and 74 constitute the end result of the color television camera proper. Three simultaneous video picture color signals are established on these conductors which may be utilized in any manner for transmission to receivers of the type which operate on simultaneous color signals. The video color signals on conductors 72, 73, and 74 may be applied to modulate suitable radio frequency carriers with side-band filtering for radio transmission as a composite simultaneous color signals transmitter.

The useful band of frequencies which extend from $F_2$ to $F_{10}$ are shown in hatching in Fig. 10. Since the frequencies up to $F_2$ are not utilized coupling condenser 65 shown in Fig. 1 may be quite small to attenuate the lower unwanted frequencies. Resistor 51 is indicated but an inductance may be used either alone or in series with the resistor, or any other suitable network may be substituted for a resistor 51 and condenser 65 to couple the output of the camera tube into unit 66. Cathode follower 66 has a low output impedance so that it can be coupled to the four band-pass amplifiers. The cathode follower may be preceded by several stages of a wide-band amplification. By way of example, if the green and red picture signals are allowed a bandwidth of 4 megacycles (mc.) each, if the blue picture signal is given 2 megacycles, and if .75 megacycle is allowed for the guard band, then the frequencies would be as follows: $F_1$=.75 mc., $F_2$=4 mc., $F_3$=4.75 mc. (green carrier), $F_4$=8.75 mc., $F_5$=9.50 mc., $F_6$=11.5 mc. (blue carrier), $F_7$=13.5 mc., $F_8$=14.25, $F_9$=18.25 (red carrier), $F_{10}$=19 mc. The actual useful combined bandwidth would be 15 mc. Of course, it is not necessary to allow 4 mc. each for the green and blue signals or even 2 mc. for the blue signal. Reductions are possible because the combined effect has more detail than each of the separate signals. Thus modest bandwidth requirements are possible and workable.

The output of the cathode follower on conductor 67 is also applied to band-pass amplifier 85 which passes a very narrow band of frequencies with the carrier $F_3$ as the center frequency. The output of 85 is applied to frequency discriminator 86 which is of standard design and tuned to frequency $F_3$. With a frequency discriminator 86 the last stage of amplifier 85 preferably may be a limiter stage of standard design to minimize the effects of amplitude changes. A standard ratio detector may be substituted in 86 instead of the discriminator and the limiter stage in amplifier 85 may be then eliminated, since the ratio detector is relatively insensitive to amplitude changes but produces an output which depends upon frequency change only. When the discriminator is referred to hereinbelow it is to be understood that a ratio detector may be used instead. In accordance with the well known operation of frequency discriminators, if the frequency delivered to it by amplifier 85 is lower than $F_3$ a positive voltage may be placed on conductor 87, while if the frequency delivered to the discriminator is higher than $F_3$ a negative voltage may be placed on conductor 87. When the frequency of the signal which is applied to the discriminator equals that to which the discriminator itself is tuned, that is $F_3$, then no voltage is placed on conductor 87. Horizontal deflection amplifier 41 is actually a variable gain amplifier with the gain controlled by the voltage on conductor 87. This amplifier may take any one of several known forms. By way of example, it may have an output tube which is coupled in a standard manner to the horizontal deflection coils and units 48 and 54. The output tube, in turn, may be driven by a multigrid tube whose first grid is connected to conductor 45 with the horizontal sawtooth wave, the third grid is connected to conductor 87 so that when the voltage on this conductor swings negatively the gain of the tube is reduced, and when the voltage swings positively the gain is increased, the second and fourth grids are connected in a standard manner as screen grids, and the fifth grid is connected to the cathode as a suppressor grid. In this manner when the frequency of the green carrier passed by amplifier 85 to frequency discriminator 86 is higher than $F_3$, which is the frequency to which the discriminator is tuned, then the gain of amplifier 41 is lowered and the amplitude of the horizontal sawtooth wave applied to the horizontal coils of camera tube 20 is lowered causing the amplitude of the horizontal sweep of the electron beam to decrease and hence scan less sinusoidals in the same time thus decreasing the green carrier frequency and bringing it closer to the required value of $F_3$. When the frequency of the green carrier passed by amplifier 85 to frequency discriminator 86 is lower than $F_3$, then the gain of amplifier 41 is increased and the amplitude of the horizontal sawtooth wave applied to the horizontal coils of camera tube 20 is increased causing the amplitude of the horizontal sweep of the electron beam to increase and hence scan more sinusoidals in the same time thus increasing the green carrier frequency and thereby bring it closer to the value of $F_3$. By stabilizing the green carrier frequency all other frequencies are stabilized because of the fixed geometrical relation between the transparencies on the color secreen. Any other carrier may be used for stabilization. The above circuit also linearizes the sweep.

Figure 5:
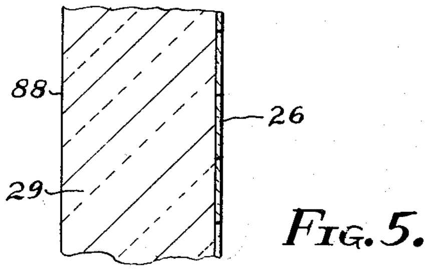
Fig. 5 is a view along the line 5—5 of Fig. 4.
Figure 6:
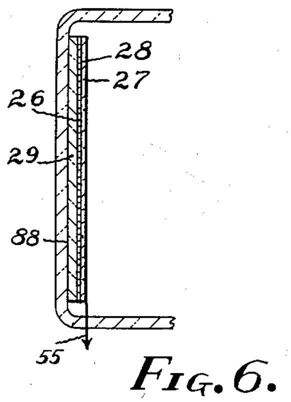
Fig. 6 is a sectional view of the front end of the image orthicon type of camera tube with color screen inserted before the photoelectric surface.

In Fig. 3 distance B is the width of the smallest picture element that should be resolved by the system. The height of this picture element is equal to the height of three adjacent color strips. The highest frequency that is produced by a picture element of this size has a sinusoidal wave with a period corresponding to $A=2B$. These dimensions also apply to the transparencies of Fig. 4. Picture detail which can be resolved into components of shorter period than A preferably should not be present in the picture light that goes through the color screen. A limitation may be placed on the picture detail which strikes the color screen by constructing the glass plate member 29, upon which the color screen 26 is deposited, of translucent material. This is illustrated in Fig. 5 which is a sectional view of Fig. 4 on the line 5—5, but it may also serve as a sectional view of the corresponding portions of Fig. 3. The glass plate 29 may be clearly transparent in all portions except the face 88. The latter face may have minute irregularities or frosting on it such that the picture light which strikes it will be scattered or diffused slightly so that upon reaching the color screen 26 the finest picture detail smaller than the element referred to above will be lost. Member 29 may be constructed of translucent material throughout, either of glass or plastic material. The degree of scattering of the light is controlled by establishing the degree or size of the irregularities on surface 88, or if the entire plate 29 is made of translucent material, its thickness may govern the amount of scattering and loss of fine detail in the light.

picture detail is limited as described hereinabove so that no overlapping of color signals will occur. Picture detail may be limited also by other means such as by inserting a thin translucent plate any place in the optical system. The option may be adopted not to attempt to limit picture detail and rely upon the fact that fine detail is weak and does not produce strong frequency components, and that it is only for the fine details that color registeration will be washed out and appear as white. This depends upon the extent of bandwidth allotted to the various colors. For lower bandwidths picture detail limitation is preferred.

The modulation process may be analyzed for one carrier, for example the green carrier designated as 31 in Fig. 3. The same results apply to all of the carriers in Fig. 2 or Fig. 4. Let $K_1=(\frac{1}{2}$ times height of a color strip in the same units as horizontal distance.) Then $K_1(1+\sin x)$ gives the distance between the bottom of a color strip and the top edge of the green transparency, in Fig. 3 for example, while $x$ is horizontal distance in radians. The distance between two successive crests of the waves of the carrier sinusoidals may be called $2\pi$ radians. This distance divided by $2\pi$ equals the distance of one radian in this measure. In Fig. 4 the expression would give the transparency which is the proportion of light that will pass multiplied by $K_1$. The results are identical. Along the direction of a color strip, the picture light intensity of the color that is passed by the strip may be considered as being composed of a multiplicity of sinusoidal components each of a different frequency, phase, and average value. This can be represented by $a_n+b_n \sin (p_n x+\Delta_n x)$ in which $a_n$ is the average value of the $n$th component, $b_n$ is the sinusoidal amplitude, $p_n$ is the ratio of the carrier sinusoidal period to the $n$th picture component period, and $\Delta_n x$ is the initial phase in radians for the $n$th component. The light intensity is never negative and varies from zero to some definite value and is expressed in appropriate units per unit area upon which the light impinges and passes through. $a_n \geqq b_n$, $b_n \geqq 0$ to insure that light intensity never goes negative. The total light intensity of the color passed by the color strip under consideration when all its components are added is $$\sum_n (a_n+b_n \sin (p_n x+\Delta_n x))$$

The summation is with respect to $n$, that is, all components are added together. When referring to Fig. 3 it is to be understood that Fig. 4 is also implied because the results are the same. If $dx$ represents a small horizontal distance then $K_1 (1+\sin x)dx$ is a small area rectangle with width $dx$ and height $K_1(1+\sin x)$. The total luminous flux going through this rectangle with the color of light under consideration is given by this area multiplied by the intensity per unit area or $$K_1(1+\sin x)\Sigma(a_n+b_n \sin(p_n x+\Delta_n x))dx$$

Let $\Delta x$=width of electron beam spot in radians. Then the total luminous flux passed through the color transparency strip of width $\Delta x$ between any two horizontal positions $x$ and $x+\Delta x$ is given by $$\int_x^{x+\Delta x} K_1(1+\sin x)\sum_n (a_n+b_n \sin (p_n x+\Delta_n x))dx = K_1 \sum_n \int_x^{x+\Delta x} (1+\sin x)(a_n+b_n \sin (p_n x+\Delta_n x))dx =$$

$$K_1 \sum_n \int_x^{x+\Delta x} [a_n+b_n \sin (p_n x+\Delta_n x)+a_n \sin x+(\sin x)b_n \sin (p_n x+\Delta_n x)]dx =$$

$$K_1 \sum_n \left[ a_n \int_x^{x+\Delta x} dx + b_n \int_x^{x+\Delta x} \sin (p_n x+\Delta_n x)dx + a_n \int_x^{x+\Delta x} \sin dx + b_n \int_x^{x+\Delta x} (\sin x) \sin (p_n x+\Delta_n x)dx = \right.$$

$$K_1 \sum_n [a_n \Delta x+2(b_n/p_n)(\sin \tfrac{1}{2}p_n \Delta x)\cdot \sin (p_n x+\tfrac{1}{2}p_n \Delta x+\Delta_n x)+2a_n \sin \tfrac{1}{2}\Delta x \cdot \sin (x+\tfrac{1}{2}\Delta x)+$$

$$(b_n/1-p_n) \sin \tfrac{1}{2}(1-p_n)\Delta x \cdot \cos ((1-p_n)x+\tfrac{1}{2}(1-p_n)\Delta x-\Delta_n x)-$$

$$(b_n/1+p_n) \sin \tfrac{1}{2}(1+p_n)\Delta x \cdot \cos ((1+p_n)x+\tfrac{1}{2}(1+p_n)\Delta x+\Delta_n x)]=K_1 V_1$$

It is obvious that the rectangular beam 22 illustrated in Fig. 3 is capable of scanning picture detail of smaller width than distance B because the width of the beam itself is approximately equal to half of the distance which corresponds to the period of the highest carrier frequency. If fine picture detail is present the modulation process will cause frequencies to be present in the side-bands of one carrier frequency which will overlap into the side-bands of other carrier frequencies thus mixing information of different colors. It is because of this that the This luminous flux produces a positive charge on the target plate given by $K_2K_1V_1$, where $K_2$ is a constant relating charge to unit luminous flux. The number of electrons deposited on the plate by the rectangular beam in the region between $x$ and $x+\Delta x$ is given by $K_3K_2K_1V_1$, where $K_3$ is a constant giving the number of electrons deposited per unit positive charge. The number of electrons returned to the gun if the electron beam has E electrons is $E-K_3K_2K_1V_1$. The beam current returning is proportional to this value, and the signal voltage produced on conductor 52 equals the impedance in the circuit leg containing resistor 51 multiplied by the returning beam current after it has been amplified by the electron multiplier. Another constant $K_4$ multiplied by the number of returning electrons will give the voltage of appropriate polarity on conductor 52, which is $$K_4E - K_4K_3K_2K_1V_1$$

Let $-K_4K_3K_2K_1 = K$, and neglect the component not involving $V_1$ and the component without sinusoidals in $V_1$. Let $$V_1 - \sum_n a_n \Delta x = V$$

then the voltage at conductor 52 without D. C. components is given by KV. This is for one color strip only, for example the green strip, and is produced as a result of light flux passing through a sinusoidal strip in any position from $x$ to $x+\Delta x$, in which $\Delta x$ is the width of the electron beam spot. As the electron beam scans the target plate the distance $x$ is a function of the time. Let $x = w_1t$. $p_nx = p_nw_1t = w_nt$. $w_1$ and $w_n$ are the angular frequencies of the carrier and picture signals component respectively.

$$p_n = w_n/w_1 = f_n/f_1$$

$f_1$ and $f_n$ are the carrier and picture component frequencies respectively. By substituting these values for $x$ in the preceding formulas there is obtained, $$KV = K\Big[2\sum_n (b_n/p_n) \sin \tfrac{1}{2}p_n\Delta x \cdot \sin (w_nt + \tfrac{1}{2}p_n\Delta x + \Delta_n x) + 2\sum_n a_n \sin \tfrac{1}{2}\Delta x \cdot \sin (w_1t + \tfrac{1}{2}\Delta x) + \sum_n (b_n/1-p_n) \sin \tfrac{1}{2}(1-p_n)\Delta x \cdot \cos ((w_1-w_n)t + \tfrac{1}{2}(1-p_n)\Delta x - \Delta_n x) - \sum_n (b_n/1+p_n) \sin \tfrac{1}{2}(1+p_n)\Delta x \cdot \cos ((w_1+w_n)t + \tfrac{1}{2}(1+p_n)\Delta x + \Delta_n x)\Big]$$

This expression gives the signal voltage at conductor 52 due to the scanning by the electron beam of one of the carrier sinusoidal strips. The direct current components are not included. There is a set of components like this for each of the three types of color strips. The first term inside the bracket gives the picture frequencies which extend over the range from the lowest to the top picture frequency. The coefficient of $t$, $w_n$ assumes all values of the present picture frequencies as $n$ takes on all of its values. The second term gives the carrier frequency with $w_1$ as the carrier angular frequency. There is only one carrier frequency component here because the summation is with respect to the coefficients, $a_n \sin \frac{1}{2}\Delta x$. Note that $\sin \frac{1}{2}\Delta x$ is a constant and the term $\sin (w_1t + \frac{1}{2}\Delta x)$ is periodically variable with respect to time representing the carrier whose amplitude is $$2\sum_n a_n \sin \tfrac{1}{2}\Delta x$$

and phase displacement is $\frac{1}{2}\Delta x$ radians. The third term gives the lower side-band components with angular frequencies $w_1 - w_n$, while the last term gives the upper side-band components with angular frequencies $w_1 + w_n$. In these expressions it is to be noted that only the sine or cosine terms involving $t$ are the frequency terms with initial phase constants. The factors which multiply the frequency terms give the amplitude of any $n$th component. The sine term in the amplitude equals its argument for small values of the latter; hence, for small values of $\Delta x$ the factor which divides $b_n$ cancels leaving $b_n$ undisturbed for all frequencies. This means that for narrow beam widths there is substantially no frequency distortion. Wider beam widths will give some distortion which can be easily corrected in the video amplifiers. Moreover, the suppression in part of one of the side-bands will cause slight frequency distortion which may be corrected in the video amplifiers. It is to be noted that the carrier amplitude $a_n \sin \frac{1}{2}\Delta x$ is maximum for $\Delta x = \pi = 180°$. If this value is chosen for the beam width its radian measure would be less for the lower carrier frequencies when the formulas for these frequencies are considered independently. Since there are three sets of the above components, it can be readily understood that the picture frequencies will occupy the same frequency band for each color in the region extending from zero to the highest picture frequency regardless of the frequencies which are set for the carriers. It is for this reason that this range is not utilized. By causing the lower side-band of the lowest carrier frequency to fall in this band and discarding it, savings can be effected in overall bandwidth. The range of frequencies above the highest upper side-band frequency of the lowest carrier are utilized by that middle carrier and its side-bands which is modulated by the color frequencies that require the least bandwidth, since both side-bands are included in this range. In the range above this the top carrier and its side-bands are located, and only one of the side-bands need be used, the other can be suppressed. If the top carrier is brought near enough to the middle carrier the lower side-band of the top carrier and the upper side-band of the middle carrier will overlap, and in such a case the filters must exclude this range and pass the lower side-band of the middle carrier and the upper side-band of the top carrier. However, Fig. 10 illustrates the case where the top carrier is sufficiently separated from the middle carrier so that both side-bands of the middle carrier may be utilized, and the lower side-band of the top carrier may be used, while most of the upper side-band of the top carrier may be suppressed to limit overall bandwidth.

Figure 7:
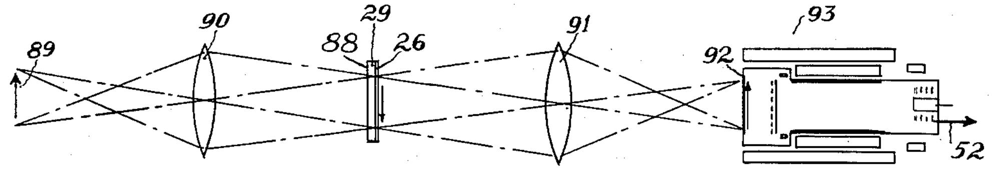
Fig. 7 is a view of the optical arrangement with color screen in the optical path outside of the image orthicon camera tube.

Fig. 7 illustrates another manner of utilizing the color screen 26 with glass plate 29 and surface 88. The light image 89 is focused by lens 90 onto the color screen 26 after going through surface 88 of optional translucency and glass plate 29. A second lens 91 focuses the image formed on the color screen 26 onto the photocathode surface 92 of the image orthicon camera tube 93. This camera tube has an electron beam which impinges upon the target plate as a rectangular spot similar to the electron beam of camera tube 20. In all other respects camera tube 93 is of standard construction. The color strips on color screen 26 are positioned substantially parallel to the horizontal picture scanning lines of camera tube 93. The operation of this system is similar to that already described in connection with Fig. 1. The system of Fig. 7 eliminates the color screen in the camera tube and places it outside in the optical system. Of course, in camera tube 93 the scanning directions of the electron beam are reversed from those of camera tube 20.

Figure 8:
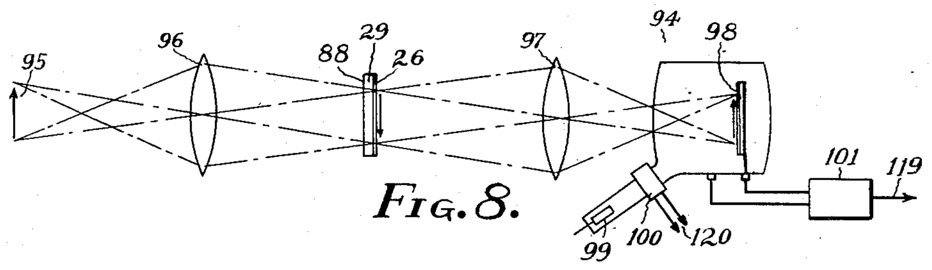
Fig. 8 is a view similar to Fig. 7 but with an iconoscope camera tube.

Fig. 8 illustrates a similar arrangement but with the iconoscope camera tube 94. The light image 95 is focused by lens 96 onto color screen 26 after going through optional translucent surface 88 and glass plate 29. A second lens 97 focuses the image formed on the color screen 26 onto the photoelectric mosaic plate of the iconoscope tube. This camera tube is equipped with a gun 99 which sends out an electron beam which strikes the mosaic plate 98 as a rectangular spot. Deflection yoke 100 is provided for standard horizontal and vertical picture scanning motion of the beam. The yoke is connected via conductors 120 to amplifiers such as 38 and 41 for obtaining the vertical and horizontal sawtooth currents respectively.

The picture signals are applied to amplifier 101 which may include a cathode follower and which is connected further by conductor 119 to the band-pass amplifier circuits and other circuits such as are illustrated in Fig. 1. The color strips on color screen 26 are positioned substantially parallel to the horizontal scanning lines of the electron beam as it strikes the mosaic plate 98. The iconoscope is standard in construction except for the rectangular beam. In accordance with the standard operation of such tube picture information in the optical image, which in this application also includes the sinusoidal carrier images, is stored in the form of a charge image on the mosaic plate as the result of the cesium-silver globules, which are photoelectric, emitting electrons proportional to the amount of light incident upon them and accumulating a positive charge as a result of the loss of electrons. When the electron beam strikes the mosaic secondary electrons are emitted in excess of the bombarding electrons, thus making the area struck by the beam positive and this value is the same equilibrium voltage for all parts of the mosaic struck by the beam. When the scanning beam passes over areas of the mosaic which are brightly illuminated and hence already having a positive charge due to the picture light, a smaller change of potential is required to reach the equilibrium voltage than for a darker, more negative areas. As a result when the light parts of the picture are scanned, the number of secondary electrons emitted from the mosaic and collected by the anode is smaller than for the dark parts of the picture. The change in the number of secondary electrons reaching the collecting ring, not shown in the drawing, as the scanning beam covers the mosaic plate is the camera signal. Such signal electrons leaving the mosaic and collected by the anode ring must return to the mosaic through a resistor contained in amplifier 101, the metal signal plate on the back of the mica sheet which supports the mosaic elements, and back to the mosaic by means of its capacitance to the signal plate through the mica dielectric. The red, blue, and green sinusoidal transparencies will cause charged color picture patterns to appear on the mosaic in accordance with the intensity of the light going through the transparencies and with the variations in the transparencies, thus producing a charge picture pattern on the mosaic arranged in horizontal strips. The electron beam spot strikes the mosaic as is illustrated, for example, by rectangular area 22 or 23 in Fig. 3. The sinusoidals correspond to the horizontal charged patterns on the mosaic. Fig. 4 is also applicable. The rectangular electron beam spot will cause the emission of secondary electrons from areas struck by the different portions of the beam which vary in accordance with the sinusoidal and picture charge pattern in the areas struck. The total instantaneous electrons emitted will depend on the charged pattern for the three primary colors added together. As the beam scans, the electron picture current will vary in accordance with the variations of picture color light passed through horizontal sinusoidal transparencies of the three primary colors together. The analysis of the components of the signal current is the same as that given hereinabove. The iconoscope is connected to standard circuits for shading, blanking, and voltage supplies which are required for it. The operation from conductor 119 to the band pass amplifiers and their associated circuits, and the stabilization circuits is similar to that described hereinabove for Fig. 1. In Figs. 1, 7, and 8, the lens 64, 90, 91, 96, and 97 are shown as single lenses in order to avoid excessive details in the drawings. It is to be understood that such lenses may be replaced by highly developed optical lens systems which may be used in various obvious modified forms known to those skilled in the art.

It is also possible to use the same general scheme with the image-dissector camera tube. Referring to Fig. 8, for example, lens 97 would focus the light going through the color screen 26 onto the photoeelctric surface of the image dissector tube. The latter would be equipped with regular scanning and focusing coils and circuits. The photoelectrons emitted by the photoelectric surface would form an electron image which would be deflected as a whole in accordance with the well known operation of such tubes. The electron multiplier of the image dissector tube would have an aperture or rectangular opening of the same height as the height of three adjacent images of the horizontal color strips focused onto its photoelectric surface. The scanning action of the electron beam would allow electrons to enter the rectangular opening in accordance with the density of electrons which would correspond to the picture light intensity and its sinusoidal variations. The electron multiplier would be connected similarly as that shown as 49 in Fig. 1. The operation of the system is otherwise similar to that described hereinabove for Fig. 1.

Figure 9:
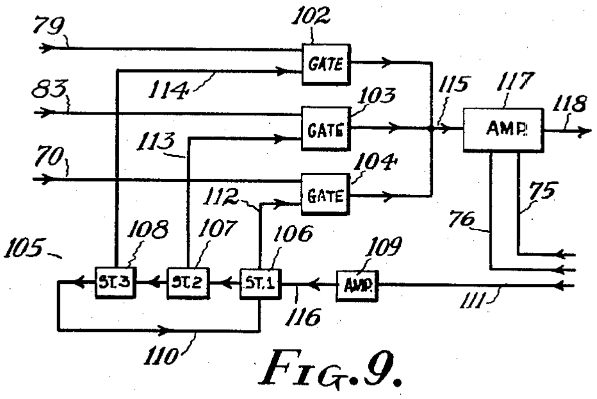

It is possible to utilize the simultaneous outputs of the demodulators, illustrated in Fig. 1, to produce sequential color signals wherein for a period of scanning of one field, for example picture signals are supplied to a conductor of one color, for the next field picture signals of another color are supplied to the same conductor, and for the next field picture signals of the third color are supplied to the same conductor. This is repeated. The switching of color information may occur at the horizontal line rate, or even the dot rate. If the picture frame repetition rate is not reduced, the field rate must be speeded up when using sequential color transmission, and a suitable horizontal line rate must be chosen. Simultaneous color signals will be placed on conductors 70, 83, and 79 regardless of the scanning rates, suitable filters being chosen for the rate used. Referring to Fig. 9, the conductors 70, 83, and 79 are connected to gates 104, 103, and 102 respectively, and disconnected from amplifiers 71, 84, and 80. The gates are actuated by a ring circuit 105, consisting of ring stages 106, 107, and 108, and ring driver 109. The stages 106, 107, and 108 are marked *St.1*, *St.2*, and *St.3* respectively in Fig. 9 representing the first, second, and third stages of the ring circuit 105. The last stage 108 is connected to the first stage 106, while ring driver 109 is connected to a conductor 111 which is connected to conductor 43 from the synchronizing generator if line sequential transmission is to be used, or it is connected to conductor 44 if field sequential transmission is to be used. The ring circuit is a standard circuit and is operated by pulses from conductor 111 which are applied to ring driver 109, which may be a cathode follower. When the circuits are turned on one of the ring stages will be rendered operative while the others are in the inoperative condition. Assume that stage 106 is operative, then a voltage will be applied to conductor 112 to open the gate 104 and allow green color signals on conductor 70 to reach common conductor 115. The first pulse applied to stage 106 via conductor 116 will cause stage 106 to be rendered inoperative while stage 107 will be rendered operative. The voltage on conductor 112 will be removed and voltage is placed on conductor 113 to open gate 103 which allows red color signals on conductor 83 to reach common conductor 115. The next pulse applied to the ring circuit will cause stage 107 to be rendered inoperative and stage 108 to be rendered operative. The voltage on conductor 113 is removed and voltage is placed on conductor 114 to open gate 102 and allow blue color signals on conductor 79 to reach common conductor 115. Thus only one of the gates 102, 103, and 104 is opened at any one time so that color signals of only one color at a time will appear on common conductor 115. The next pulse on conductor 116 will render stage 108 inoperative and stage 106 operative thus starting the cycle of operations over again. By way of example, ring stages 106, 107, and 108 may consist of tubes whose cathodes are tied together to a common resistor, with this common circuit point driven by driver 109. The plate circuits of these tubes may be coupled to the gates 102, 103, and 104 which may consist of multigrid tubes one for each gate. The control grids would be connected to conductors 70, 83, and 79 respectively, while other grids such as the suppressor grids may be connected to the leads 112, 113, and 114 respectively. A reversing tube may be included in each stage of the ring circuit to couple to conductors 112, 113, and 114. Any means may be utilized to periodically switch the gates at the rate of the pulses on conductor 111. Conductor 115 is applied to common control amplifier 117 with blanking conductor 75 and synchronizing conductor 76 driven from the synchronizing generator at the appropriate rate. The output of amplifier 117 is applied to conductor 118 which is fed to the video line amplifier and then distributed to monitor stations and the transmitter.

In the sequential switching scheme gain controls in each of the amplifiers 68, 77, and 81 could be used to set the level of each of the color video signals independently before the signals enter amplifier 117. The latter has a gain control to set the overall level of the sequential signal.

Figure 2:
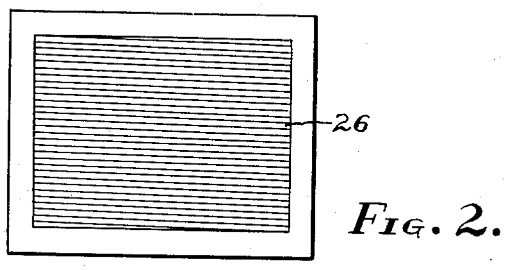
Fig. 2 is a view of the color screen with horizontal color strips but with details not shown in the color strips. Fewer of these areas are shown than would be actually used in order to avoid excessive detail in the drawing.

One method of constructing the color screen is to cut out colored strips of large dimensions and to place them together to form a large area similar in shape to Fig. 2, and then take a color photograph of this, reducing it to the required dimensions. The strips may be cut out as in Fig. 3 and fastened against a black background, or as in Fig. 4. For the latter each color strip could have a thin transparent plastic film placed over it. On this film the variable densities in the form of black-and-white deposit could be placed. The color photograph could be taken with the color sensitive material deposited on a glass plate which would serve as plate 29. Of course, the color screen may be produced in any other feasible manner such as direct deposition of the color transparent material on the glass plate.

While I have described the principles of my invention in connection with specific apparatus, it is to be understood that this description is made only by way of example and not as a limitation to the scope of my invention.

I claim:

1. In a color television camera, a camera tube having a transparent color plate with a plurality of series of wave form means of specified wave lengths positioned thereon, each series of wave form means being transparent to light of one primary color and all of the wave forms of each series having the same wave length, the members of each series extending horizontally along the plate and the different series spaced vertically along the plate with each series transparent to a primary color different from the primary colors to which adjacent series are transparent.

2. In a color television camera a color plate, a plurality of series of wave form means of predetermined wave lengths positioned on said color plate, each series of said wave form means emitting light of a different primary color, all of the wave form means of each series having the same wave lengths and the wave form means of the different series having different wave lengths, each series of wave form means extending along a first axis of said color plate and the different series being disposed along the other axis of said color plate with each series emitting light of a primary color different from the light of the primary colors emitted by the adjacent series so that when the light emitted from said color plate impinges upon the photosensitive surface of the camera tube and the electrical pattern set up by the photoelectric surface is interrogated by a cathode ray beam of the camera tube, signal voltages are produced in which simultaneous signal components exist for each of the primary colors.

3. In a color television camera having a photosensitive surface, an electron beam directed toward said photosensitive surface, deflection elements for deflecting the beam, and an optical system for directing a light image onto the photosensitive surface, a transparent color plate; a plurality of series of wave form means of predetermined wave lengths positioned on said transparent color plate, each series of said wave form means transmitting light of a different primary color, all of the wave form means of each series having the same wave lengths and the wave form means of the different series having different wave lengths, the various series of wave form means extending horizontally along said color plate and the different series being disposed vertically along the plate with each series transmitting light of a primary color different from the light of the primary colors transmitted by the vertically adjacent series so that when the beam is caused to sweep the electrical pattern established by the photosensitive surface signal, voltages are produced which contain simultaneous components for each of the primary colors.

4. A color television camera comprising a camera tube having a photosensitive surface, an optical system for focusing light images on said photosensitive surface, a transparent color plate positioned between said optical system and said photosensitive surface, a plurality of series of wave form means of predetermined wave lengths positioned on said transparent color plate, each series of said wave form means transmitting light of a different primary color, all of the wave form means of each series having the same wave lengths and the wave form means of the different series having different wave lengths, the various series of wave form means extending along a first coordinate direction of said color plate and the different series being disposed along a second coordinate direction of said color plate with each series transmitting light of a primary color different from the light of the primary colors transmitted by the adjacent series, and cathode ray beam means for interrogating the electrical pattern established by said photosensitive means to produce signal voltages in which simultaneous signal components exist for each of the primary colors.

5. A color television camera according to claim 4 wherein the said wave form means comprises sinusoidally variable area transparencies.

6. A color television camera according to claim 4 wherein the said wave form means comprises sinusoidally variable density transparencies.

7. A color television camera according to claim 4 having means responsive to one of said signal components to stabilize the horizontal velocity of the electron beam.

8. A color television camera according to claim 4 in which said cathode ray beam means includes means for producing a rectangular shaped beam, the height of the beam in the second coordinate direction being substantially equal to the combined heights of three adjacent wave form means.

9. A color television camera comprising a camera tube, means for forming a cathode ray beam in said camera tube, means for repetitively deflecting said beam in two coordinate directions at predetermined rates for picturing scanning, a photosensitive surface in said camera tube, optical means for focusing light images onto said photosensitive surface, a transparent color plate having a plurality of series of wave form means of predetermined wave lengths positioned thereton, each series of wave form means being transparent to light of a different primary color, all of said wave form means of each series having the same wave length and the wave form means of the different series having different wave lengths, each series of wave form means extending along said transparent color plate in one of the coordinate directions and the different series being spaced along said color plate in the other coordinate direction with each series transparent to a primary color different from the primary colors to which the adjacent series are transparent, means for positioning said transparent plate to pass light from said optical means to said photosensitive surface and means including said cathode ray beam and said photosensitive surface for producing signal voltages in which simultaneous signal components exist for each of the primary colors.

10. The combination according to claim 9 including means connected to receive the signal voltages from said camera tube for separating the signal components of each of the primary colors from the signal components of each of the other primary colors.

11. The combination according to claim 9 having means including the wave lengths of said wave form means for establishing a different carrier frequency for each of said signal components, and means responsive to one of the carrier frequencies for stabilizing the sweep rate of the cathode ray beam.

12. The combination according to claim 11 wherein said last mentioned means comprises filter means tuned to pass a narrow band of frequencies centered about one of the carrier frequencies, means connecting said filter means to receive the signal voltages from said camera tube, frequency discriminating means responsive to the output of said filter means to produce a voltage of a first polarity when the carrier frequency to which said filter means is tuned is below a predetermined frequency and to produce a voltage of an opposite polarity when the carrier frequency to which said filter means is tuned is above a predetermined frequency and means responsive to the voltage of a first polarity to increase the sweep velocity of said electron beam and responsive to the voltage of the opposite polarity to decrease the sweep velocity of said electron beam.

13. The combination according to claim 9 having means including the wave lengths of said wave form means for establishing a different carrier frequency for each of said signal components, the wave lengths of said wave form means being such that the lowest frequency of the lower side-band of a first of the carrier frequencies exceeds the highest frequency of the upper side-band of a second of the carrier frequencies and the highest frequency of the upper side-band of the first carrier frequency is lower than the lowest frequency of the lower side-band of a third carrier frequency.

14. The combination according to claim 13 in which the wave length of the wave form means for producing the second carrier frequency is such that the second carrier frequency is above the picture signal frequencies and the frequencies of the lower side-band of the second carrier frequency extend into the region of the picture signal frequencies.

15. The combination according to claim 13 having a first circuit means turned to pass the first carrier frequency and both of its side-bands, a second circuit means tuned to pass the second carrier frequency and its upper side-band and a third circuit means tuned to pass the third carrier frequency and its lower side-band, and means connecting said first, second, and third circuit means to receive the signal voltage output of said camera tube.

16. The combination according to claim 15 having a separate means, connected to receive the output of each of said first, second, and third circuit means, for demodulating each of the carrier frequencies, means for sequentially and cyclically switching the demodulated signals from each of said separate means into a signal circuit and means for switching said last mentioned means at one of the beam deflection repetition rates.

17. A color television camera comprising a camera tube including a photosensitive means adopted to emit photoelectrons on one side having a pattern determined by a light image received on the other side thereof, a target plate, means for focusing the photoelectron pattern on said target plate, means for producing a cathode ray beam directed at said target plate and means for causing the cathode ray beam to scan repetitively said target plate in the horizontal and vertical directions at predetermined rates; a transparent color plate positioned in juxtaposition to said photosensitive means between the source of light images and said photosensitive means, said transparent color plate, having a plurality of series of wave form means of predetermined wave lengths positioned thereon, each series of wave form means being transparent to light of a different primary color, all of said wave form means of each series having the same wave length and the wave form means of the different series having different wave lengths, each series of wave form means extending horizontally along said transparent color plate and the different series being spaced vertically along the plate with each series transparent to a primary color different from the primary colors to which the vertically adjacent series are transparent, and means including the cathode ray beam and said target plate for producing signal voltage in which simultaneous signal components exist for each of the primary colors.

18. A color television camera comprising a camera tube, means for forming a cathode ray beam in said camera tube, means for repetitively deflecting said beam in a first and a second coordinate direction for picture scanning, a photosensitive surface in said camera tube, optical means for focusing light images onto said photosensitive surface, a transparent means having a plurality of series of wave form means of predetermined wave lengths positioned thereon, each series of wave form means being transparent to light of a different primary color, all of said wave form means of each series having the same wave length and the wave form means of the different series having different wave lengths, each series of wave form means extending along said transparent means in the direction of one of the coordinate directions of scanning and the different series being spaced along said transparent means in the direction of the other of the coordinate directions of scanning with each of said series being transparent to a primary color different from the primary colors to which the adjacent series are transparent, means positioning said transparent means to pass light from said optical means to said photosensitive surface and means including said cathode ray beam and said photosensitive surface for producing signal voltages in which simultaneous signal components exist for each of the primary colors.

19. The combination in accordance with claim 18 wherein said transparent means comprises the front face of said camera tube.

References Cited in the file of this patent

UNITED STATES PATENTS

| | | |
|---|---|---|
| 2,294,209 | Roder | Aug. 25, 1942 |
| 2,577,368 | Schultz | Dec. 4, 1951 |
| 2,586,482 | Rose | Feb. 19, 1952 |
| 2,587,074 | Sziklai | Feb. 26, 1952 |